United States Patent [19]
Pecceu

[11] Patent Number: 5,410,931
[45] Date of Patent: May 2, 1995

[54] MECHANICAL SHIFTING DEVICE
[75] Inventor: Hendrik Pecceu, Oostnieuwkerke, Belgium
[73] Assignee: Clark Equipment Belgium, N.V., Brugge, Belgium
[21] Appl. No.: 218,462
[22] Filed: Mar. 28, 1994

Related U.S. Application Data
[63] Continuation of Ser. No. 104,240, Aug. 9, 1993, abandoned, which is a continuation of Ser. No. 917,068, Sep. 29, 1992, abandoned.

[30] Foreign Application Priority Data
Nov. 30, 1990 [DE] Germany ............... 40 38 278.8
[51] Int. Cl.$^6$ .................... G05G 9/02; F16H 59/02
[52] U.S. Cl. ................... 74/473 P; 74/335; 74/471 XY; 74/473 R
[58] Field of Search ........... 74/335, 470, 471 XY, 74/473 R, 473 P; 200/6 A

[56] References Cited

U.S. PATENT DOCUMENTS

| | | | |
|---|---|---|---|
| 3,172,300 | 3/1965 | Schneider | 74/471 X |
| 3,180,174 | 4/1965 | Walter | 74/475 |
| 3,282,122 | 11/1966 | Magg et al. | 74/473 |
| 3,354,744 | 11/1967 | Kuhnle et al. | 74/645 |
| 3,433,087 | 3/1969 | Winter et al. | 74/473 |
| 3,559,501 | 2/1971 | Wieland | 74/476 |
| 3,580,112 | 5/1971 | Dach | 74/868 |
| 3,585,319 | 6/1971 | Payerle | 74/471 X |
| 3,593,599 | 7/1971 | Dach | 74/869 |
| 3,680,405 | 8/1972 | Naumann et al. | 74/523 |
| 3,707,095 | 12/1972 | Uhlenhaut et al. | 74/473 R |
| 3,708,047 | 1/1973 | Kuhnle et al. | 192/12 C |
| 3,710,647 | 1/1973 | Dach et al. | 74/731 |
| 3,712,156 | 1/1973 | Kuhnle | 74/858 |
| 3,718,056 | 2/1973 | Feider et al. | 74/865 |
| 3,732,755 | 5/1973 | Beig et al. | 74/866 |
| 3,747,431 | 7/1973 | Uhlenhaut | 74/524 |
| 3,757,599 | 9/1973 | Albrecht | 74/473 R |
| 3,776,058 | 12/1973 | French | 74/471 X |
| 3,779,097 | 12/1973 | Kurz et al. | 74/477 |
| 3,786,689 | 1/1974 | Houk | 74/471 X |
| 3,791,239 | 2/1974 | Schreiner | 74/752 C |
| 3,861,705 | 1/1975 | Burchard et al. | 280/91 |
| 3,894,433 | 7/1975 | Beig et al. | 74/476 |
| 3,926,068 | 12/1975 | Jantzen et al. | 74/473 R |
| 4,005,620 | 2/1977 | Dach et al. | 74/865 |
| 4,026,169 | 5/1977 | Kuhnle et al. | 74/861 |
| 4,158,969 | 6/1979 | Tuksa | 74/477 |
| 4,334,130 | 6/1982 | Beig | 200/61.54 |
| 4,350,055 | 9/1982 | Pinomaki | 74/471 X |
| 4,351,205 | 9/1982 | Fischer | 74/866 |
| 4,360,718 | 11/1982 | Schobinger et al. | 200/4 |
| 4,363,389 | 12/1982 | Zaunberger et al. | 192/0.042 |
| 4,406,175 | 9/1983 | Puchta | 74/473 R |
| 4,466,023 | 5/1987 | Achberger et al. | 192/4 A |
| 4,485,443 | 6/1987 | Knodler et al. | 364/424.1 |
| 4,685,548 | 8/1987 | Holtermann et al. | 192/0.08 |
| 4,742,733 | 5/1988 | Schreiner | 74/866 |
| 4,817,467 | 4/1989 | Furtner et al. | 74/866 |
| 4,817,470 | 4/1989 | Muller et al. | 74/866 |
| 4,895,054 | 1/1990 | Rauneker et al. | 74/877 |
| 4,896,568 | 1/1990 | Giever | 74/861 |
| 4,897,790 | 1/1990 | Bieber | 74/866 X |

FOREIGN PATENT DOCUMENTS

| | | | |
|---|---|---|---|
| 1163428 | 2/1964 | Germany . | |
| 2456839 | 7/1975 | Germany . | |
| 3238048 | 4/1984 | Germany . | |
| 1605218 | 11/1987 | U.S.S.R. | 74/471 X |

Primary Examiner—Allan D. Herrmann
Attorney, Agent, or Firm—Watts, Hoffmann, Fisher & Heinke Co.

[57] ABSTRACT

A mechanical switching apparatus has a housing (1) which contains a ball (5) supported in a retainer (4). A control lever (2) projects radially from the input side of the ball (5) and is rigidly fixed so that, together with the ball (5), two rotational movements can be made along axes (19, 24) which are perpendicular to each other and pass through the mid-point (6) of the ball (5). On the output side, two separate transmission elements (13, 23) are provided which consist of pins and whose axes (14, 24) lie parallel to each other. The two transmission elements (13, 23) are each coupled to the ball (5) via a free-wheel mechanism, whereby the two free-wheel mechanisms are so formed and arranged in relation to each other that the first free-wheel mechanism engages for the first transmission element (13) when the control lever (2) is moved through its first rotational movement, and the other free-wheel mechanism is then free-wheeling for the other transmission element (23), whereas when the control lever (2) is moved through its second rotational movement the situation is reversed.

21 Claims, 6 Drawing Sheets

MECHANICAL SHIFTING DEVICE

This application is a continuation of application Ser. No. 08/104,240, filed Aug. 9, 1993, abandoned, which is a continuation of Ser. No. 07/917,068, filed Sep. 29, 1992, abandoned.

BACKGROUND OF THE INVENTION

1. Technical Field

The invention refers to a mechanical switching apparatus with a housing containing a retainer supporting a ball which has a control lever projecting radially from it on the input side and said lever is rigidly fixed so that, together with the ball, two rotational movements can be made along axes which are perpendicular to each other and pass through the mid-point of the ball. Such mechanical switching apparatus is used, for example, to switch gearboxes in construction plant, in particular wheel loaders, excavators, and similar equipment. Such construction plant and associated vehicles have gearboxes for driving and operating which possess several forward and several reverse gears so that the operator must have the possibility of, first of all, being able to select the general direction of travel, forwards or backwards, in order that, from this first position, for example in forward travel, he/she is then able to select the appropriate forward gear by changing up or down without there being the danger that a reverse gear is accidentally selected during this procedure.

2. Description of the Prior Art

A mechanical switching apparatus of the above-mentioned type is also known for private vehicle applications for tilting the external mirror about its two swivelling axes to enable the external mirror to be adjusted to the desired spatial angle. In this case the switching apparatus has a housing containing a retainer supporting a ball which can swivel or rotate in all directions. A control lever is rigidly connected to the ball, whereby the possibilities for movement of the control lever and therewith the ball too, are limited by a shift gate corresponding to its construction. With this known switching apparatus for adjusting the external mirror, the control lever can be swivelled from a neutral middle position into two planes perpendicular to each other which intersect at the axis of the control lever. Four individual positions can be attained in order to bring about the four movements necessary for the external mirror. Here, the two positions in each of the two planes are allocated opposing movements. In order to finally cause the appropriate swivel movement of the external mirror, electrical contacts are located in the area of the control lever and, therewith, the housing which are actuated by the control lever in the respective swivel position. The electrical contacts can be provided on the side of the control lever where this projects radially from the ball. However, it is also possible to provide an extension piece on the other side of the ball, in line with the axis of the control lever, which in turn, actuates the four switch contacts concerned. A disadvantage of this switching apparatus is that the electrical switch contacts are located in the immediate vicinity of the control lever and thus within the housing for the mechanical switching apparatus. Therefore, the electrical switch contacts are not separated from the mechanical parts of the switching apparatus. If the gear shift gate is, for example, in the shape of a cross, then each of the four switching positions can only be reached from the neutral middle position, i.e. it is not possible, for example, with a driving gearbox, to first preselect the general direction of travel, forward or reverse, and then from this position, to select an appropriate different forward or reverse gear.

DESCRIPTION OF THE INVENTION

The invention is concerned with the aforementioned problem and attempts to provide a switching apparatus which initiates movement via a control lever on the input side which is can then be taken up or transferred on the output side, whereby two types of movement then ensue on the output side which are independent from each other. To illustrate this the first type of movement should be allocated, for example, to the forward and the reverse travel, while the second type of movement is to be the changing up or changing down of the respective gear in the forward or reverse direction. In this case an obvious movement of the control lever, for example, when changing up a gear, should thus be possible in the same direction regardless of whether forward or reverse travel was already selected as the general direction of travel. It is also important to transmit the movements on the output side so that subsequent electrical switches, electronic control components, etc. are kept separate from the mechanical parts of the switching apparatus and can, thereby, be accommodated in a special housing which is additional to the housing for the mechanical switching apparatus.

According to the invention, this is achieved in the mechanical switching apparatus described above in that two separate transmission elements are provided on the outputside, which are formed from pins and the axes of which are arranged parallel to each other, and that the two transmission elements are each coupled with the ball via a free-wheel mechanism, whereby the two free-wheel mechanisms are so constructed and positioned in relation to each other that, with the first rotational movement of the control lever, the first free-wheel mechanism has a catch function for the first transmission element and the other free-wheel mechanism has a free-wheel function for the other transmission element, while with the second rotational movement of the control lever the situation is reversed. On the input side, only a control lever makes contact with the ball, the movements of which are, in connection with a gearshift gate, so restricted that it can make two rotational movements in two planes perpendicular to each other and passing through the mid-point of the ball. Here, there is the possibility that the control lever can make two swivel movements, i.e. rotational movements around two such axes perpendicular to each other neither of which coincides with the axis of the control lever itself. In this case the two axes around which rotation is possible and the control lever axis together form a three-dimensional axis system. However, it is also possible that one of the two rotational movements is actually the rotation of the control level about its own axis. In this case the gear shift gate is an elongated hole., slotted version. The gear shift gate can be formed between the control lever and the housing for the control facility or also from parts of the retainer in which the ball is supported. It is essential to allocate to the control lever on the input side with its two movement possibilies two transmission elements located on the output side, whereby the first transmission element only transfers movement corresponding to the first rotational movement of the control lever, and the other transmission element only movement of the other rotational movement of the control lever. Furthermore, this transferring must be carried out in an independent fashion. This means, for example, that a rotational movement at the control lever, which changes down a gear, for example, should be possible regardless of whether, in the travel situation concerned, forward or reverse travel is in operation. In both cases changing down a gear must take place.

The arrangement of the two separate transmission elements on the output side with their axes parallel to each other renders it possible to construct these transmission elements relatively long as pins, slides or similar, and to lead away from the ball parallel to each other and in such a direction so that they can pass through the wall of the housing for the switching apparatus and also through the side of a second housing, whereby a simple seal in the region of the penetrations in the two housing walls is possible. This has the advantage that subsequent electronic switching and control components in the second housing can be accommodated separated and protected from the mechanical parts in the first housing, i.e. the housing for the switching apparatus.

A free-wheel mechanism is located between the ball and each of the two transmission elements on the output side. The construction of the free-wheel mechanisms, their arrangement and the arrangement of the transmissions elements relative to the ball are all matched to each other in that the two free-wheel mechanisms have, alternately, free-wheel and catch functions related to the two rotational movements of the control lever on the input side. This means that with the first rotational movement of the control lever, the first free-wheel mechanism has a catch function and the other free-wheel mechanism has a free-wheel function so that only one of the two transmission elements on the output side performs or transmits any movement, while the other transmission element shows no movement and thereby remains stationary. With the second rotational movement of the control lever the situation is then reversed. This allocation reflected in the construction of the gate in such a way that an unambiguous sequence is possible starting from the neutral middle position. Firstly, for example, only the first rotational movement is possible starting from the neutral middle position and this selects the general direction of travel, forwards or backwards. Then, when one of these two general directions of travel has been selected, the second rotational movement of the control lever is possible, while at the same time, the first rotational movement is blocked. It is then possible to change up or change down a gear. During this second rotational movement there is no chance of changing the general direction of travel, forwards or backwards.

The two individual transmission elements located on the output side perform different movements. The first transmission element can carry out a rotational movement and the other transmission element a translation movement. The first transmission element is arranged with its axis in line with the mid-point of the ball; the free-wheel mechanism of this transmission element is located in the region of the mid-point of the ball. This transmission element performs a rotational movement but no translation movement. The rotational movement is than carried out when the axis, around which the control lever rotates, coincides with the axis of this transmission element. The free-wheel mechanism which is allocated to the other transmission element must then have a free-wheel function. The free-wheel mechanisms described in this application can also be designated as clutches. The clutches provided must have, on the one hand, a catch function and, on the other hand, a free-wheel function regardless of around which axis the control lever is turned or swivelled. If it is a rotational movement then this always means a limited swivel or rotational movement around its own axis, consequently, never a rotational movement of more than 360° but rather always a swivelling movement within a relatively narrow range of angles of, perhaps, up to 45° or 90° maximum.

The free-wheel mechanism of the first transmission element can be constructed as a joint, torsion spring, folding bellows or similar. These construction possibilities mean that this free-wheel mechanism, or rather the clutch, can be formed in a very simple fashion. This is also the objective of the present invention. Such a joint, torsion spring, folding bellows or similar has a catch function with rotational movement around its own axis or the axis of the transmission element, while a rotational movement around an axis perpendicular to this causes a free-wheel function.

The other transmission element must then be located with its axis outside the mid-point of the ball; the associated free-wheel mechanism for this transmission element is switched between a surface of the ball and the transmission element. In this case it can be the surface of the ball in the retainer directly or a piece of a further surface of, for example, a ball surface with a larger radius which is rigidly connected with the ball on which the control lever sits. This second free-wheel mechanism or clutch must be so constructed that it only has a catch function when the free-wheel mechanism or clutch of the first transmission element has a free-wheel function or vice versa.

This construction can be achieved in a very simple manner in that the free-wheel mechanism of the second transmission element is formed from an arc-shaped rib on the surface of the ball and a groove in the second transmission element, whereby the axis of the arc-shaped rib, i.e. the axis around which the arc-shaped rib is located relative to the ball, coincides with the axis of the first transmission element. Therefore, if the first transmission element performs a rotational movement, then the arc-shaped rib merely slides along in the groove of the second transmission element without the second transmission element performing any movement.

The arc-shaped rib can be a special part coupled with the ball and may be arranged on a larger radius than the inner side of the retainer. Only if one of the transmission elements is arranged with its axis in line with the mid-point of the ball and the other transmission element is arranged with its axis parallel to this does the possibility arise of achieving two movements independent of each other on the output side without using an elbow joint or gear wheels, whereby the first movement is a rotational movement and the other movement is a translation movement. In fact it is possible to so arrange the two transmission elements that neither is provided with its axis in line with the mid-point of the ball. In such a case, however, the axes of the two transmission elements must be perpendicular to each other so that these two movements can only then be in turn further transmitted in the same direction into a second housing by using a right-angle drive, gear wheels or similar.

The ball of the switching apparatus may have two extension pieces for the selective connection with the control lever, the axes of which are offset by 90° to each other. Therefore, it is possible to use essentially identical parts of the switching apparatus and still fix the control lever alternatively on one or the other extension piece of the ball. In one case the control lever performs two rotational movements around two axes which are both vertical in relation to the control lever axis. In the other case one of the two rotational movements is a turning movement about the control lever axis. Despite these two possibilities, nothing alters on the output side.

The first transmission element can perform a rotational movement and the second transmission element can perform a translation movement. Of equal importance is the opposite arrangement because, in particular, the establishment of the designation for the first and second transmission element is not compulsory. However, it is also possible that both transmission elements perform rotational movements.

It is advisable if both transmission elements can be sealed as they pass through the wall of the housing to the switching apparatus. The sealing can then be carried out in a very simple manner. For example, it is sufficient to arrange the appropriate O-rings. Despite this in-line arrangement and the projection of the transmission elements through the wall of the housing and, if necessary, one wall of the second housing, the rotational movements of the control lever in the two plane perpendicular to each other on the input side are not hindered by this.

It is useful if the ball is supported by a spring whose end not adjacent the ball is moved and guided into catch indents on the housing. This results in the advantage that the supporting of the ball is essentially free of any play because it is always pressed by the spring from one side into the retainer. Another advantage is that the catch indents show the operator that the correct position has been attained.

Several embodiment examples of the mechanical switching apparatus are illustrated in the drawings and are explained in the following.

BEST MODE FOR CARRYING OUT THE INVENTION

Figure 1:
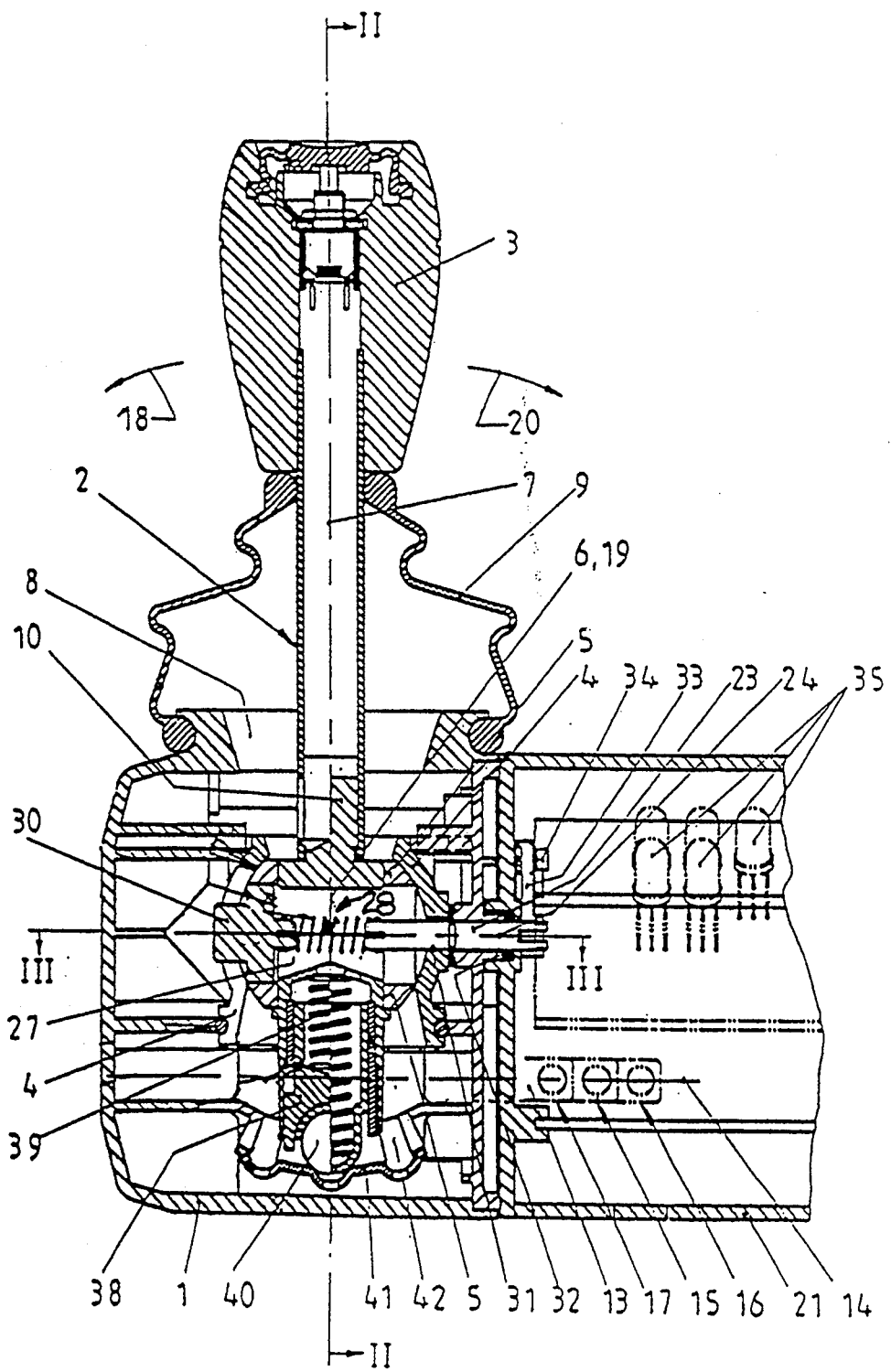
FIG. 1 shows a vertical cross-section through a first embodiment example.
Figure 2:
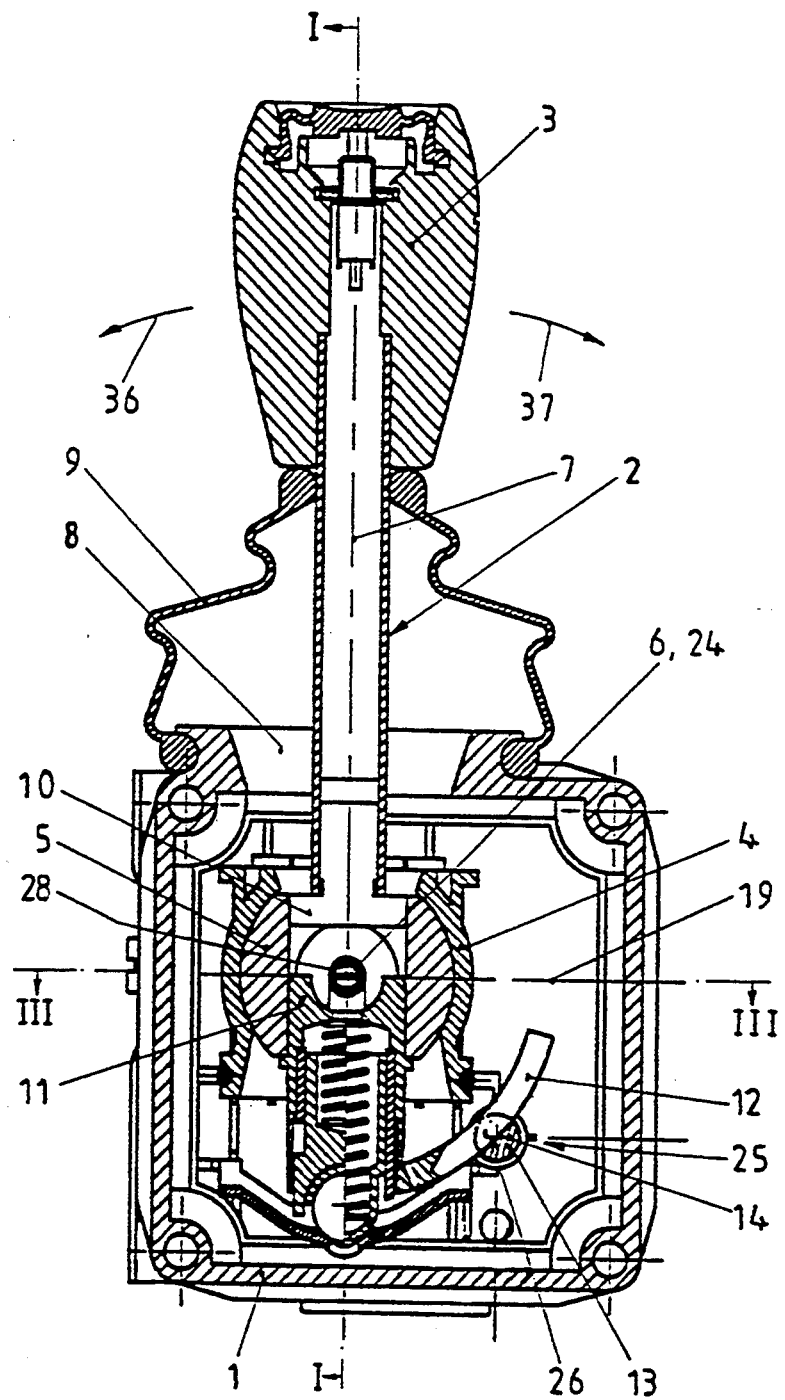
FIG. 2 shows a cross-section II—II as indicated in FIG. 1.
Figure 3:
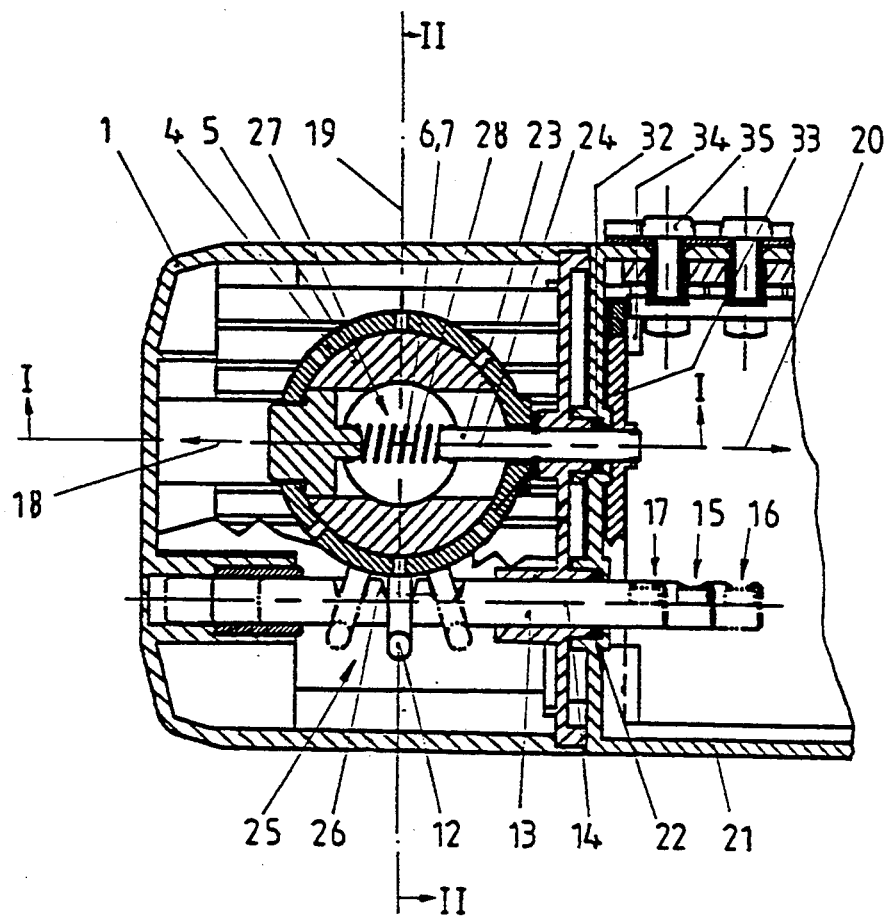
FIG. 3 shows a cross-section III—III as indicated in FIGS. 1 and 2.

The switching apparatus illustrated in FIGS. 1 to 3 has a housing 1 in which all mechanical parts of the switching apparatus are accommodated. It is understood that an associated control lever 2 with knob 3 leads outwards from the housing 1 in order to enable operation on the input side. Located inside the housing 1 is a retainer 4 which has perforations in several locations, as shown, and forms a circular inner surface in which a ball 5 is supported. The ball 5 is essentially constructed as a hollow ball and also possesses perforations in various locations. The ball 5 and the retainer 4 have a common mid-point 6. The control lever 2 has an axis 7 which passes through the mid-point 6 of ball 5. The housing 1 and/or retainer 4 has an H-shaped opening 8 which forms a gear shift gate for the possible movements of control lever 2. The opening 8 is covered and protected by a flexible gaiter 9. A connecting piece 10, which serves for the fixing of the control lever 2 to the ball 5, is coupled to the ball 5.

As is particularly obvious from FIG. 2, coupled to the ball 5 is an extension piece 11 which leads out from the ball 5 on the opposite side to the control lever 2 and has an arc-shaped rib 12 with an essentially circular cross-section projecting into space and, therefore, also reproduces the surface of the ball 5 but at a larger radius. Instead of the arc-shaped rib 12 it would also be possible to directly utilize the surface of the ball 5 but this results in difficulties in the constructional arrangement because of the small amount of space.

The arc-shaped rib 12 is allocated to a first transmission element 13 which can best be seen in FIG. 3. The transmission element 13 is constructed as a pin is and so supported in the housing 1 that it can perform a translation movement in the direction of its axis 14. The various positions are indicated in FIGS. 1 and 3 by means of double chain dot lines. A neutral middle position 15, a first translation position 16 and a translation position 17 are indicated, whereby the first translation position 16 could be allocated to the forward travel and the second translation position 17 to the backward travel. From FIGS. 1 to 3 it can be seen that the control lever 2 is swept through a first plane I, corresponding to the plane of the drawing in FIG. 1, in the direction of arrow 18 making a rotational movement around an axis 19 perpendicular to plane I and passing through the mid-point 6 of the ball 5. In the opposite swivel direction, as shown by arrow 20, around the same axis 19, the second translation position 17, which could be allocated to the backward travel, is attained. It is to be understood that the translation positions 16 and 17 are associated with appropriate electric switches or other electronic control components which are not illustrated here. The electrical or electronic components are accommodated in a housing 21, protected and separated from housing 1. The two housings 1 and 21 are connected to each other via flanges and the transmission element 13 is passed through the two adjacent walls of housings 1 and 21 with the help of an O-ring 22.

However, not only the first transmission element 13 is provided on the output side; there is also a further transmission element 23 which is also constructed in pin or bolt form and has an axis 24. The axis 24 of transmission element 23 is in line with the mid-point 6 of the ball 5. The axes 14 and 24 run parallel to each other. The two transmission elements 13 and 23 are thus aligned in the same direction when seen from the ball 5 so that their ends away from the ball finish in the second housing 21 and, therefore, lead out of the housing 1.

A first free-wheel mechanism 25, which can also be designated as a clutch, is switched between the transmission element 13 and the ball 5 (and thus the control lever 2 as well). This free-wheel mechanism 25 is essentially formed by the arc-shaped rib 12 and a groove 26 which spans over a section of the perimeter of the pin-type transmission element 13 as illustrated (FIGS. 2 and 3). There is some play between the rib 12 and the groove 26 which either remains constant, increases or decreases according to the direction of movement. It can be seen that when the control lever is moved through plane I according to arrows 18 and 20, the play increases because the transmission element 13 is carried along by the rib 12 into the translation position 16 or 17. If, however, there is a rotational or swivelling movement of the control lever 2 about axis 24 which, perpendicular to the plane of the drawing, passes through the mid-point 6, then the transmission element 13 remains in its position and the rib 12 merely slides along into the groove 26. With this direction of movement the free-wheel mechanism 25 has a free-wheel function while with a swivelling movement of the control lever 2 through the plane I, i.e. about axis 19, it has a catch function.

A free-wheel mechanism or clutch 27 is also switched between the transmission element 23 and the ball 5 or rather the control lever 2. This free-wheel mechanism 27 is arranged at the mid-point 6 of the ball 5. It can be made from a torsion spring 28 as shown in FIG. 3. The form of the free-wheel mechanism 27 passing through an articulated joint 29 is shown clearly in FIGS. 7 and 8. One of the ends of the torsion spring 28 (designated only in FIG. 3) is coupled to the transmission element 23. Its other end is supported by and connected to an insert 30. The insert 30 is fixed, for example, screwed, into the perforated ball 5. The free-wheel mechanism 27 has a catch function when turned about the axis 24 so that via the torsion of the ball 5 about axis 24, the transmission element 23 performs a rotational movement. However, with a rotational movement of the ball 5 around axis 19 the torsion spring 28 merely kinks so that the free-wheel mechanism 27 has a free-wheel function. The transmission element 23 then performs no rotational movement.

Anyway, the transmission element 23 is only constructed and arranged to perform, if necessary, rotational movements, and not translation movements. The transmission element 23, through a recess in ball 5 and an opening in retainer 4, is also passed through the two walls of housings 1 and 21 facing each other and finishes in the interior of housing 21. An O-ring 32 serves as the seal. A switch arm 33 is fixed on the free end of the transmission element 23 which successively actuates a series of electric switches 34, only indicated in FIG. 1, upon rotation around axis 24 which are allocated to the individual gears which are to be switched in the forward or reverse travel. The housing 21 can have a corresponding number of LEDs 35 in order to indicate to the operator the actual gear.

The control lever 2 not only performs the rotational or swivelling movements around the axis 19 corresponding to the arrows 18 and 20 in the plane of the drawing shown in FIG. 1, but also a second rotational or swivelling movements around the axis 24, i.e. in the plane of the drawing shown in FIG. 2 according to the arrows 36 and 37. This movement is also limited by the opening 8 in the housing 1. Under such a turning movement, the clutch 27 has a catch function for transmission element 23, while the clutch 25 has a free-wheel function for transmission element 13. In doing this, the set first or second translation position 16 or 17 of transmission element 13 is not left but rather the transmission element 23 turns around the axis 24 so that the switch arm 33 successively actuates the individual switches 34. Then the sweep direction according to arrow 36 can be allocated to changing up the gears, i.e. for example, from 2nd gear to 3rd gear, etc., while the sweep movement according to arrow 37 is allocated to changing down, i.e. for example, from 6th gear down to 5th gear or similar.

It should also be mentioned that the gear shift gate is so formed by the opening 8 that the sweep movement about axis 24 is only possible from the first or second translation position 16 or 17, but not from the neutral middle position 15.

Beneath ball 5, i.e. on the opposite side to the control lever 2, is a spring 39 which is switched between the extension piece 11 supporting rib 12 and a socket 38, whereby the socket 38 is supported by a ball catch 40. This is illustrated in a partial cross-section. The other partial cross-section shows a somewhat modified, however, functional similar construction. The ball catch works in conjunction with a slip surface 41 in which indented grooves 42 are provided corresponding to the neutral middle position 15 and the two transmission positions 16 and 17. The ball 5 is always pressed against the retainer 4 by a spring 39 so that the parts are always in a defined, relative position to each other. As the ball catch clicks into the respective groove 42, this shows the operator that the desired correct position has been reached.

The operation and switching sequence of the mechanical switching apparatus can be as follows, and can be assigned to switching the gearbox of an item of construction plant, for example, a wheel loader, as follows: From the neutral middle position according to FIGS. 1 to 3, the control lever 2 is first swivelled about axis 19 according to arrow 18. The transmission element 23 thus remains untriggered while transmission element 13 takes on the translation position 16. Starting from this position, the control lever 2 can now perform a second rotational movement according to arrow 36, (FIG. 2), i.e. around axis 24. The free-wheel mechanism 25 thereby functions as a free-wheel, the rib 12 merely slides through the groove 26, but the transmission element 13 remains in the translation position 16, while the transmission element 23 is turned via the clutch 27 because of its catch function. Therefore, the switch arm 33 also turns and an upward gear change takes place as desired. This is how, for example, a gear change from first to second gear is accomplished. If the driver wishes to change up further, for example, from 2nd to 3rd gear, the driver keeps the control lever 2 in the swivelled position-according to arrow 36 until the actual gears change up in succession is indicated to the driver by the LEDs 35. If, for example, the fifth gear is reached, as desired by the driver, then the driver can bring back the control lever 2, in the opposite direction to arrow 36, to the position shown in FIG. 2 so that the fifth gear remains in operation. The switching sequence can, however, be realized in a different manner. It is, for example, possible that from a swivelled position, the control lever 2 is brought back automatically according to arrow 36, and then a new swivelling movement according to arrow 36 is necessary for change up to a further gear. The same applies to changing down. With this second switching concept, the control lever 2—still with a first transmission position 16 in operation—is in a sort of initial position between the two sweep possibilities according to arrows 36 and 37 so that the operator has the choice, during forward travel, to change up or down a gear. Whether the choice of gear actually occurs depends on other factors.

The same is true in principle for travel in reverse. This means a simple, clear and logical switching possibility for the operator resulting from the particular design of the mechanical switching apparatus.

Figure 4:
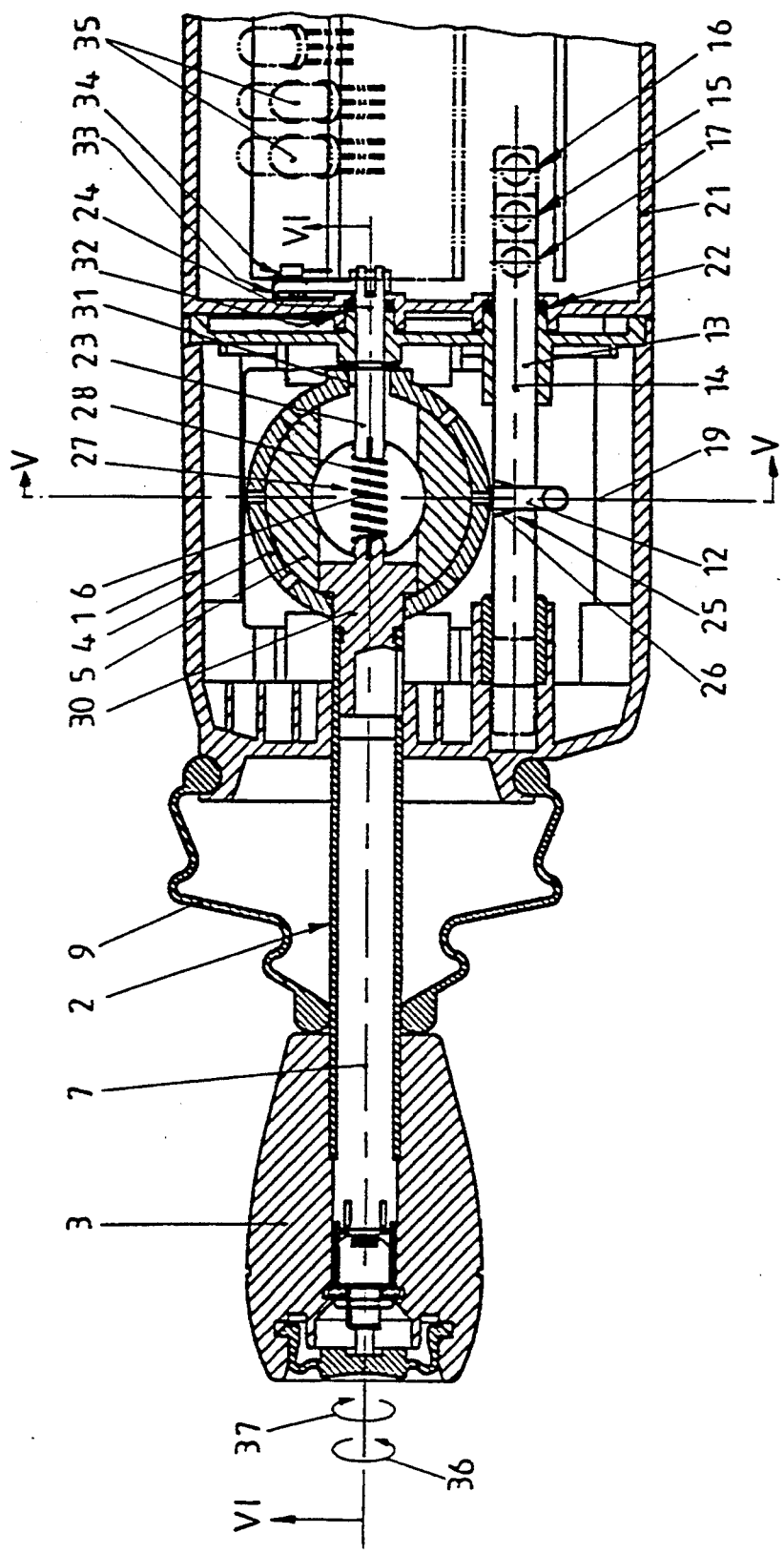
FIG. 4 shows a horizontal cross-section through a second embodiment example of the switching apparatus.
Figure 6:
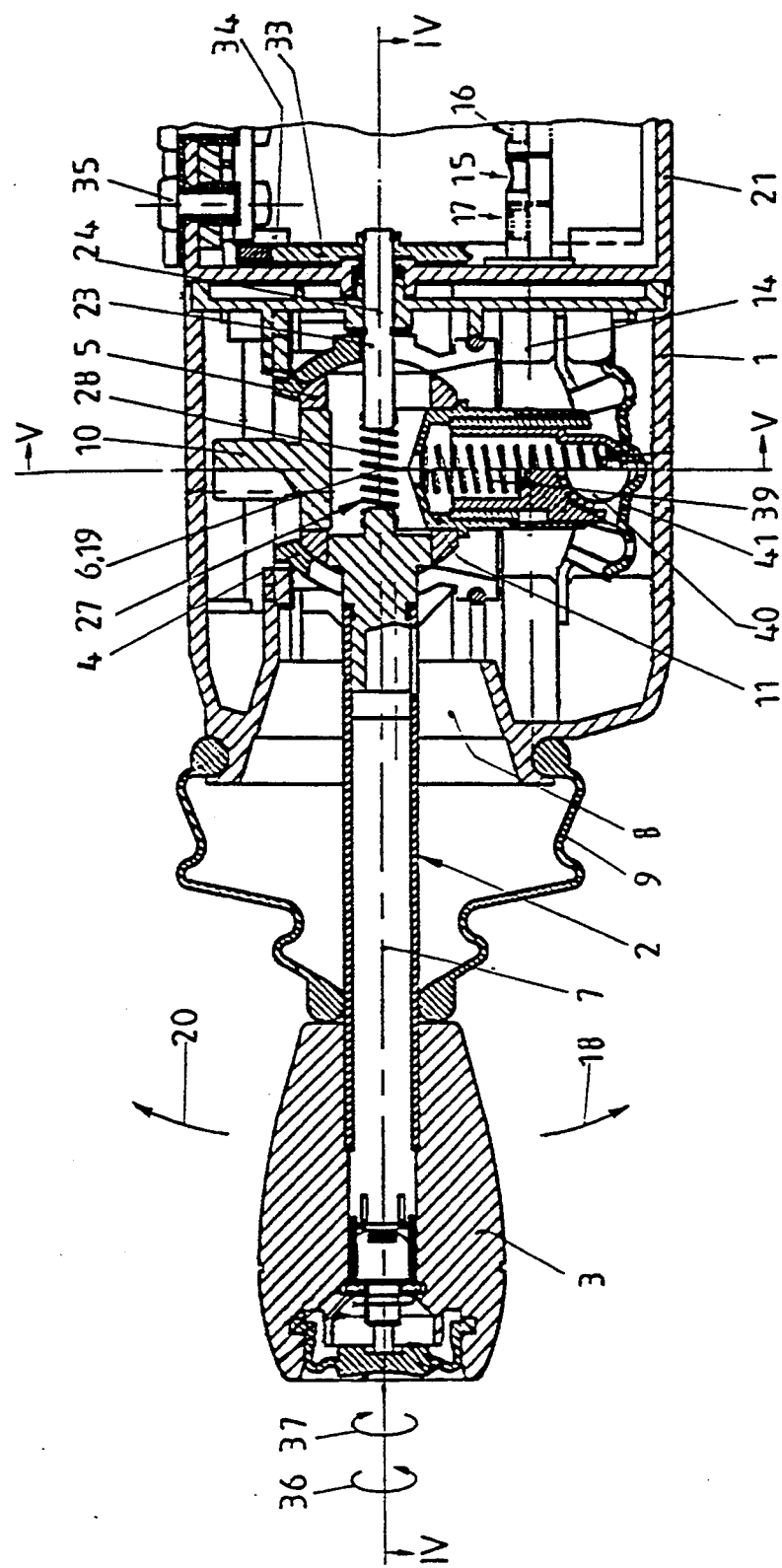
FIG. 6 shows a cross-section VI—VI as indicated in FIGS. 4 and 5.
Figure 5:
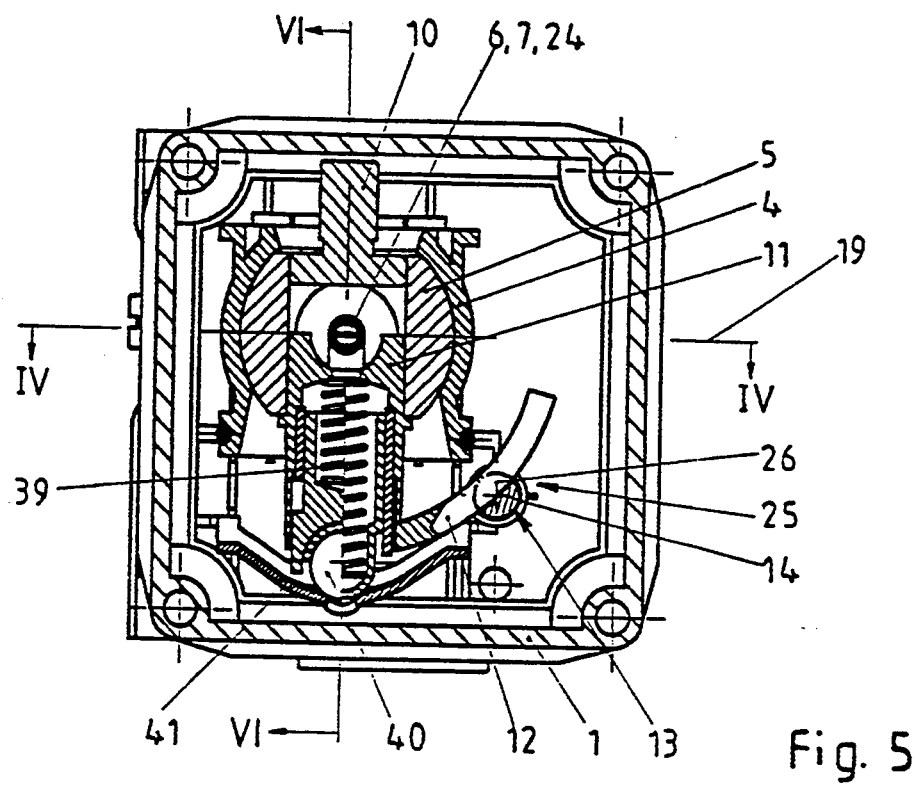
FIG. 5 shows a cross-section V—V as indicated in FIG. 4.

FIGS. 4 to 6 illustrate a second version of the mechanical switching apparatus in three cross-sections related to each other whereby the drawings do not correspond to those of FIG. 1 to 3 with respect to the sequence, but show that this second version is, almost identical with the first version or rather, the majority of the individual parts can be used for both versions. Here, only the control lever 2 is not attached to extension piece 10 but, on the contrary, to insert 30 which is provided in a suitably modified form to the insert 30 in embodiment example of FIGS. 1 to 3 so that the control lever 2 can be fixed to it. The relative position and the construction of the two transmission elements 13 and 23 on the output side are identical. Equally, only control lever 2 catches in a different position of the ball and in such a way that the axes 7 and 24 coincide. The sweep movement according to arrows 18 and 20 about axis 19 shown in FIG. 1 is now presented in FIG. 6. Owing to the different arrangement of control lever 2 in relation to ball 5, the second rotational movement of control lever 2 now becomes a movement around its own axis 7 or 24. This is illustrated in FIG. 6 and FIG. 4. Consequently, the construction of the opening 8 is reduced to an elongated slot according to FIG. 6. This also results in a logical and easily comprehensible switching possibility for the operator in that, for example, the rotational movement is allocated to forward travel according to the arrow 18, to backward travel according to arrow 20, to changing up according to arrow 36, and to changing down according to arrow 37. Understandably, in this case the construction of the free-wheel mechanisms or clutches 25 and 27 is always executed in such a way that if the first clutch has a catch function the other clutch has a free-wheel function, and vice versa.

Figure 7:
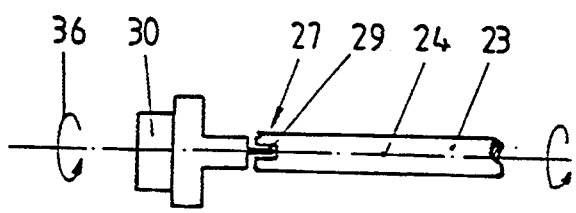
FIG. 7 shows a separate view of a joint which operates as a free-wheel mechanism.
Figure 8:
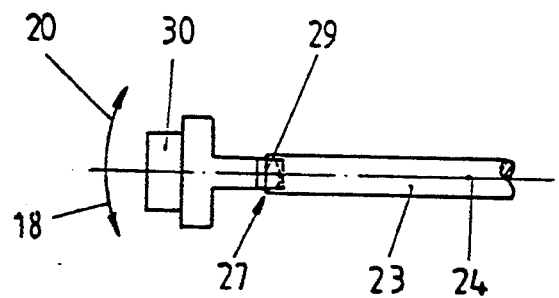
FIG. 8 shows a plan view of FIG. 7.

A different form of construction for the free-wheel mechanism 27 is shown in FIGS. 7 and 8. Here, only the second transmission element 23 and the insert 30 are shown in relation to the mid-point of the ball. It can be seen that instead of a torsion spring 28, an articulated joint 29 is realized which consists of a projecting disc at the insert 30 and a corresponding slot in transmission element 23. Upon rotational movement according to arrow 36 the free-wheel mechanism 27 has a catch function, while a rotational movement in direction of arrow 18 or 20 is followed by a free-wheel function. Instead of the torsion spring 28 or the articulated joint 29, a segment of a rubber tubing could be incorporated in order to realize the clutch 27.

I claim:

1. A mechanical shifting apparatus for effecting shifting of a multigear transmission by movement of first and second transmission elements, said apparatus comprising:
   a) a housing;
   b) a retainer structure within said housing configured for mounting a ball for rotation;
   c) a ball mounted in said retainer structure;
   d) a control lever mounted on said ball to facilitate rotation of said ball by an operator; and
   e) apparatus coupling said first and second transmission elements to said ball and being responsive to rotative movement of said ball for imparting rotational movement only to said first transmission element in response to rotative motion of said ball about a first axis, and for imparting longitudinal movement only to said second transmission element in response to rotative movement of said ball about a second axis.

2. The apparatus of claim 1, wherein:
   a) movement of said first transmission element controls the direction of transmission output; and
   b) movement of said second transmission element determines the gear ratio in which the transmission operates.

3. The apparatus of claim 1, wherein:
   a) said first and second transmission elements are generally configured as rods.

4. Apparatus for mechanically controlling movement of first and second elements of a transmission to control shifting of said transmission, said apparatus comprising:
   a) a housing;
   b) a retainer substantially within said housing;
   c) a ball supported by said retainer for rotational movement about first and second mutually orthogonal axes;
   d) a control element rigidly fixed with respect to said ball and projecting from said ball, said control element constituting an input side of said apparatus;
   e) said first and second transmission elements being configured generally as pins having substantially parallel axes; and
   f) first and second coupling mechanisms for coupling said first and second transmission elements, respectively, to said ball for movement in response to rotational movement of said ball, said first and second coupling mechanisms being constructed such that said first coupling mechanism performs a catch function for said first transmission element when said ball is rotated about its first axis of rotation and said second coupling mechanism performs a free-wheel function for said second transmission element, said functions of said coupling mechanisms being exchanged in response to rotation of said ball about its said second axis of rotation.

5. Apparatus according to claim 4, characterized in that the first transmission element is arranged with its axis in line with the mid-point of the ball, and that the mechanism coupling apparatus of this transmission element is arranged in the region of the mid-point of the ball.

6. Apparatus according to claim 5, characterized in that the coupling mechanism of the first transmission element comprises an articulated joint or a torsion spring.

7. Apparatus according to claim 4, characterized in that the second transmission element is arranged with its axis displayed from the mid-point of the ball, and that the corresponding coupling mechanism of said second transmission element is switched between a surface of the ball and said second transmission element.

8. The apparatus of claim 7, wherein movement in one of said control elements is substantially rotational movement and movement in said other control element is substantially rectilinear movement.

9. Apparatus according to claim 7, characterized in that said second coupling mechanism comprises an arc-shaped rib on the surface of the ball and a groove defined in said second transmission element, whereby the axis of the arc-shaped rib coincides with the axis of the second transmission element.

10. Apparatus according to claim 9, characterized in that the arc-shaped rib is connected to the ball and defines a radius larger than that defined by the inner surface of the retainer.

11. Apparatus according to claim 4, characterized in that the ball comprises two pieces for facilitating alternative connection with said control lever, and the axes of rotation of which are arranged offset to each other.

12. Apparatus according to claim 4, characterized in that the second transmission element is mounted to execute a rotational movement and the first transmission element is mounted to execute a translation movement.

13. Apparatus according to claim 4, further comprising means for feeding said transmission elements through a wall of the housing for the switching apparatus while substantially maintaining said housing sealed.

14. Apparatus according to claim 4, characterized in that said housing defines indentations and the ball is supported by a spring whose end away from the ball is movably guided into said indentations.

15. A lever operated transmission control including a housing containing a retainer supporting a ball on which a control lever is rigidly fixed and which projects radially outwardly from an input side and which, together with the ball can perform two rotational movements about axes, said axes being perpendicular to each other and which pass through a mid-point of the ball, and two separate elongate control elements being provided on an output side, characterized in that the two elongate elements have axes arranged parallel to each other, said two control elements being coupled with the ball via first and second movement coupling mechanisms respectively, said movement coupling mechanisms constructed and arranged in such a way that the first movement coupling mechanism operates to couple movement of said control lever with the first control element only when said control lever is rotated about said first rotational axis and the other movement coupling mechanism is operative to couple movement of said control lever with said other control element only when said control lever is rotated about said second rotational axis.

16. The apparatus of claim 15 wherein said first axis is coincident with a longitudinal axis of said control lever.

17. The apparatus of claim 15 wherein said first and second rotational axes are both substantially perpendicular to a longitudinal axis of said control lever.

18. The apparatus of claim 15 further comprising a gate for inhibiting rotation of said control lever about said second axis when said control lever is in a neutral position and further inhibiting movement of said control lever about said first axis when said control lever is in other than said neutral position.

19. The apparatus of claim 15 wherein said first movement coupling mechanism comprises a rib-like element extending from said ball and engaged in a slot defined by said first control element.

20. A mechanical shifting apparatus for effecting shifting of a multigear transmission by movement of first and second transmission elements, said apparatus comprising:
   a) a housing;
   b) a retainer structure within said housing configured for mounting a ball for rotation;
   c) a ball mounted in said retainer structure;
   d) a control lever mounted on said ball to facilitate rotation of said ball by an operator; and
   e) apparatus coupling said first and second transmission elements to said ball and being responsive to rotative movement of said ball for moving only said first transmission element in response to rotative motion of said ball about a first axis, and for moving only said second transmission element in response to rotative movement of said ball about a second axis;
   f) such that movement of said first transmission element controls the direction of transmission output; and
   g) such that movement of said second transmission element determines the gear ratio in which the transmission operates.

21. A mechanical shifting apparatus for effecting shifting of a multigear transmission by movement of first and second transmission elements, said apparatus comprising:
   a) a housing;
   b) a retainer structure within said housing configured for mounting a ball for rotation;
   c) a ball mounted in said retainer structure;
   d) a control lever mounted on said ball to facilitate rotation of said ball by an operator; and
   e) apparatus coupling said first and second transmission elements to said ball and being responsive to rotative movement of said ball for moving only said first transmission element in response to rotative motion of said ball about a first axis, and for moving only said second transmission element in response to rotative movement of said ball about a second axis;
   f) said first and second transmission elements being generally configured as rods; and
   g) said coupling apparatus, in response to ball rotative movement, imparts axial rotative movement to one of said transmission elements, and longitudinal movement to the other of said transmission elements.

* * * * *